(12) United States Patent
Liang et al.

(10) Patent No.: US 9,483,835 B2
(45) Date of Patent: Nov. 1, 2016

(54) DEPTH VALUE RESTORATION METHOD AND SYSTEM

(71) Applicants: Lingyan Liang, Beijing (CN); Ying Zhao, Beijing (CN); Liyan Liu, Beijing (CN)

(72) Inventors: Lingyan Liang, Beijing (CN); Ying Zhao, Beijing (CN); Liyan Liu, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/697,804

(22) Filed: Apr. 28, 2015

(65) Prior Publication Data

US 2015/0326845 A1 Nov. 12, 2015

(30) Foreign Application Priority Data

May 9, 2014 (CN) .......................... 2014 1 0195236

(51) Int. Cl.
| | | |
|---|---|---|
| G06K 9/00 | (2006.01) |
| G06T 7/00 | (2006.01) |
| H04N 13/00 | (2006.01) |
| G06F 3/01 | (2006.01) |
| G06T 5/00 | (2006.01) |
| G06T 5/50 | (2006.01) |

(52) U.S. Cl.
CPC ............ G06T 7/0097 (2013.01); G06F 3/017 (2013.01); G06T 5/002 (2013.01); G06T 5/50 (2013.01); G06T 7/0081 (2013.01); H04N 13/0022 (2013.01); G06T 2200/04 (2013.01); G06T 2207/10024 (2013.01); G06T 2207/10028 (2013.01); G06T 2207/20141 (2013.01); G06T 2207/20144 (2013.01); G06T 2207/30196 (2013.01)

(58) Field of Classification Search
CPC . H04N 13/0022; G06F 3/017; G06T 7/0081; G06T 2207/20141
USPC ........ 382/154; 348/42; 345/419, 427; 356/12
See application file for complete search history.

(56) References Cited

U.S. PATENT DOCUMENTS

| 6,911,995 B2 | 6/2005 | Ivanov et al. |
| 2009/0016732 A1* | 1/2009 | Ueno .................. H04B 10/504 398/139 |
| 2011/0228987 A1 | 9/2011 | Iwasaki et al. |

(Continued)

OTHER PUBLICATIONS

Michael Van den Bergh et al. "Depth SEEDS: Recovering Incomplete Depth Data using Superpixels" WACV 2013: Workshop on Application of Computer Vision, pp. 363-368(2013).

(Continued)

*Primary Examiner* — Samir Ahmed
(74) *Attorney, Agent, or Firm* — Harness, Dickey & Pierce, PLC

(57) ABSTRACT

Disclosed is a method comprising steps of conducting image preprocessing so as to respectively obtain a candidate object region including a foreground image in a depth map and a color image; determining whether it is necessary to conduct a region growing process with respect to the candidate object region of the depth map; in the former case, conducting the region growing process with respect to the candidate object region of the depth map; and conducting, after the region growing process is conducted with respect to the candidate object region of the depth map, a depth value restoration process with respect to a candidate region.

18 Claims, 5 Drawing Sheets

(56) References Cited

U.S. PATENT DOCUMENTS

| | | |
|---|---|---|
| 2011/0298898 A1* | 12/2011 | Jung .................. H04N 13/0239 348/47 |
| 2012/0242794 A1 | 9/2012 | Park et al. |
| 2012/0306876 A1 | 12/2012 | Shotton et al. |
| 2013/0002814 A1 | 1/2013 | Park et al. |
| 2013/0033713 A1* | 2/2013 | Patana .................. G03B 35/14 358/1.9 |
| 2015/0055828 A1 | 2/2015 | Zhao et al. |
| 2015/0055829 A1 | 2/2015 | Liang |
| 2015/0104067 A1 | 4/2015 | Liu |
| 2015/0124059 A1 | 5/2015 | Georgiev et al. |

OTHER PUBLICATIONS

"Region growing" Wikipedia, http://en.wikipedia.org/wiki/Region_growing.
"Gaussian function" Wikipedia, http://en.wikipedia.org/wiki/Gaussian_function.
U.S. Appl. No. 14/600,402, filed Jan. 20, 2015.
U.S. Appl. No. 14/629,650, filed Feb. 24, 2015.
U.S. Office Action dated Apr. 8, 2016, issued in U.S. Appl. No. 14/629,650.
Office Action dated Sep. 8, 2016 issued in related U.S. Appl. No. 14/629,650.

* cited by examiner

DEPTH VALUE RESTORATION METHOD AND SYSTEM

BACKGROUND OF THE INVENTION

1. Field of the Invention

The present invention relates to a method and a system for conducting a depth restoration process with respect to a depth map.

2. Description of the Related Art

At present, a human machine interaction system is being widely used in various fields. In particular, a hand gesture control system is very popular. An effective hand gesture control system may provide a kind of convenient operation method in the human machine interaction system.

As well known, regarding a hand gesture recognition system on the basis of an image and/or vision, its recognition accuracy is easily influenced by the quality of an input image especially when recognizing some special hand gestures such as those related to a sign language and fingertips. As a result, how to obtain a high quality image, by which it is easy to recognize a specific object thereof, becomes a very important problem. In a conventional human machine interaction system, in order to locate and segment a specific object, for example, a hand of a human body in an input image to be recognized, it is necessary to let a user wear, for example, a special glove having a predetermined color. By utilizing this kind of system, it is possible to easily and effectively locate each finger of the human hand. However, this kind of system is very sensitive to its environment. That is to say, when this kind of system is utilized, for example, the color of the special glove must be different from the background color. As a result, the application range of this kind of system is restricted. At the same time, since the user must wear, for example, the special glove in the process of utilizing this kind of system, this may result in not only inconvenience but also high cost.

With the development of an image processing technique, a color image has been used to conduct recognition and segmentation with respect to a human hand in the color image recently. Although this kind of method is simple and effective, it is also easily affected by a similar background color or a lighting condition.

Furthermore, with the improvement of the performance of a 3D camera, the 3D camera has been also involved in the human machine interaction system recently. By using a depth map captured by the 3D camera, it is possible to conveniently segment a part of a human body on the basis of a depth threshold value.

For example, in U.S. Pat. No. 6,911,995 B2, a kind of segmentation method is proposed in which first, by using a stereo camera, a current image and a background image of a scene are captured; then, by subtracting the background image from the current image, a foreground image is acquired; and then, on the basis of a predetermined depth threshold value, a segmentation process is conducted with respect to an area including fingertips. However, in this patent, only the predetermined depth threshold value is used to conduct the segmentation with respect to the fingertip area. As a result, in a process of conducting pixel point matching with respect to a multi-angle image so as to obtain a depth map, the boundary of the depth map is easily influenced by noise. This may result in loss of depth values of some pixel points or giving incorrect depth values to some pixel points.

Moreover, in a paper entitled "Depth Seeds: Recovering Incomplete Depth Data Using Superpixels" (WACV 2013: Workshop on Application of Computer Vision) and written by Michael Van den Bergh, an expansion method on the basis of a seed pixel point is proposed for recovering the lost depth information of some pixel points so as to obtain a more real depth map. In particular, this method includes pixel block level update and pixel level update. In a pixel block level (layer), color histogram based statistical information is adopted, and in a pixel level (layer), both color information and depth information are adopted. However, although this method is effective for processing a large object, it does not have a beneficial effect on recovering detailed information.

SUMMARY OF THE INVENTION

In general, due to the restriction of depth measurement criteria and object surface properties, an initially generated depth map (hereinafter, for the sake of convenience, it is also called a "depth map" or a "depth image") always includes some optical noise and mismatched boundaries, or forms some holes therein. As a result, hand gesture detection or recognition on the basis of this kind of depth map may be negatively influenced, so as to reduce the performance of a system such as a sign language recognition system or a virtual whiteboard interaction system. Therefore, in order to increase the robustness of a hand gesture recognition system, it is necessary to carry out noise reduction or depth value restoration with respect to this kind of depth map.

According to a first aspect of the present invention, a depth value restoration method is provided. The depth value restoration method includes:

a preprocessing step of conducting image preprocessing with regard to a depth map and its corresponding color image, so as to respectively obtain a candidate object region including a foreground image from the depth map and its corresponding color image;

a determination step of determining, based on an area ratio of an invalid region to the candidate object region of the depth map, whether it is necessary to conduct a region growing process with respect to the candidate object region of the depth map;

a growing step of, if it is determined that it is necessary to conduct the region growing process with respect to the candidate object region of the depth map, then conducting, based on image information of the depth map and its corresponding color image, the region growing process with respect to the candidate object region of the depth map; and after the region growing process is conducted with respect to the candidate object region of the depth map, a restoration step of, regarding the grown candidate object region, conducting, based on the image information of the depth map and its corresponding color image, a depth value restoration process with respect to a candidate region.

According to a second aspect of the present invention, a depth value restoration system is provided. The depth value restoration system includes:

an image preprocessing part (also called a "preprocessing part") configured to conduct image preprocessing with regard to a depth map and its corresponding color image, so as to respectively obtain a candidate object region including a foreground image from the depth map and its corresponding color image;

a region growing determination part (also called a "determination part") configured to determine, based on an area ratio of an invalid region to the candidate object region of the depth map, whether it is necessary to conduct a region growing process with respect to the candidate object region of the depth map;

a region growing part (also called a "growing part") configured to, if the determination part determines that it is necessary to conduct the region growing process with respect to the candidate object region of the depth map, then conduct, based on image information of the depth map and its corresponding color image, the region growing process with respect to the candidate object region of the depth map; and a depth value restoration part (also called a "restoration part") configured to, after the region growing process is conducted with respect to the candidate object region of the depth map, regarding the grown candidate object region, conduct, based on the image information of the depth map and its corresponding color image, a depth value restoration process with respect to a candidate region.

In addition, the embodiments of the present invention are mainly used for reducing image noise and restoring partially-lost depth data.

DETAILED DESCRIPTION OF THE PREFERRED EMBODIMENTS

In order to let those people skilled in the art better understand the present invention, hereinafter the present invention will be concretely described on the basis of the drawings and various embodiments.

Figure 1:
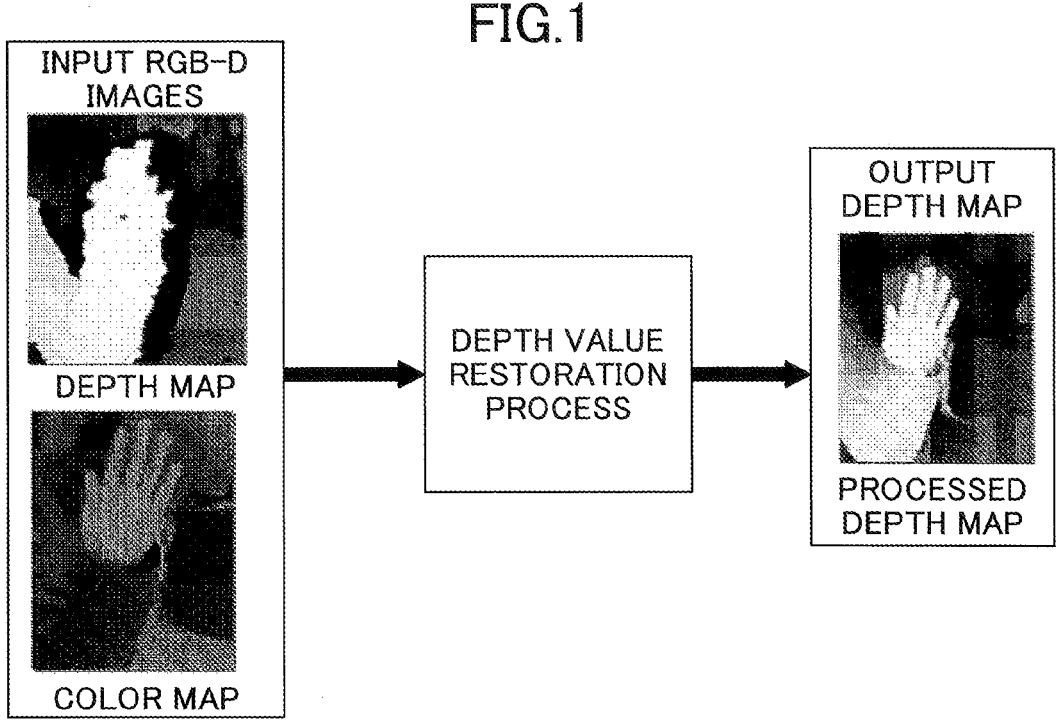
FIG. 1 illustrates a scenario of restoring a depth value(s) of a depth map, which is related to the present invention.

FIG. 1 illustrates a scenario of restoring a depth value(s) of a depth map, which is related to the present invention.

As shown in FIG. 1, a depth map may be processed on the basis of both the depth information of the depth map and the color information of a color image (for example, a RGB color image) corresponding to the depth map by utilizing a depth value restoration method according to an embodiment of the present invention, so that it is possible to obtain a processed depth map. Here it should be noted that the region respectively represented by the depth map and its corresponding color image will serve as a candidate region described below.

From the depth map shown in FIG. 1, it is obvious that due to the influence of edge noise, it is impossible to distinguish among the five fingers of a human hand therein. On the contrary, from the processed depth image shown in FIG. 1, it is obvious that the depth values of the five fingers are retained, and at the same time, some incomplete depth data are restored. In this way, it is possible to clearly distinguish among the five fingers of the human hand.

Figure 2:
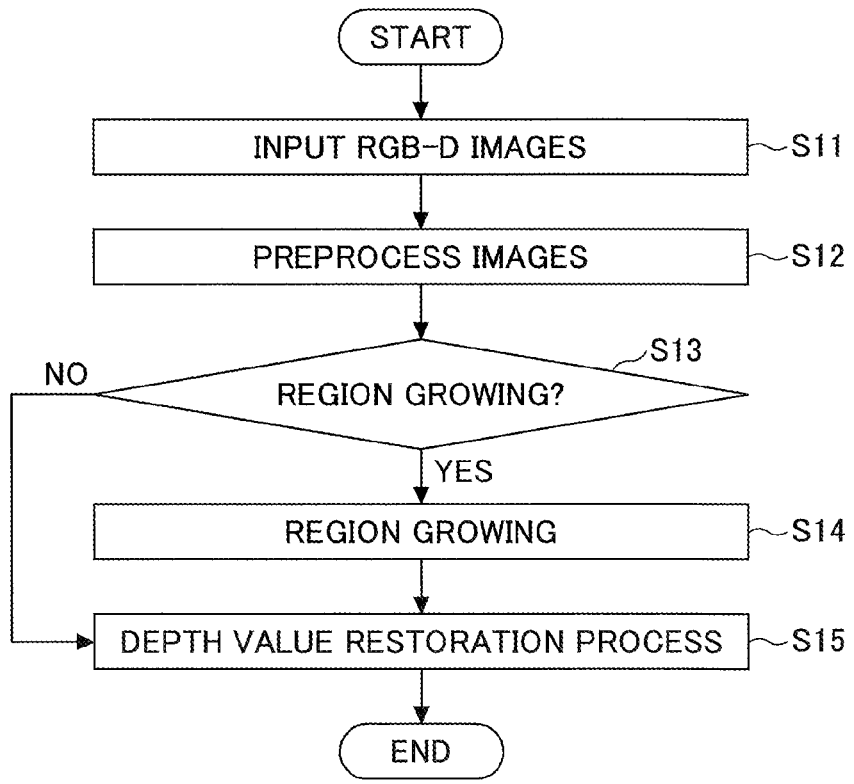
FIG. 2 is a flowchart of a method of restoring a depth value(s) of a depth map, according to an embodiment of the present invention.

FIG. 2 is a flowchart of a method of restoring a depth value(s) of a depth map, according to an embodiment of the present invention.

As shown in FIG. 2, in STEP S11, both a depth map (also called a "D map") and a color image (for example, a RGB color image) corresponding to the depth image captured by a depth camera are input by an image input part 101 (also called an "input part 101") of a depth value restoration system 100 (which will be described below by referring to FIG. 6). Here it should be noted that the input depth image and its corresponding color image are also called "RBG-D images". In addition, the input RGB-D images may also be captured by another image capture device at the same time.

Figure 6:
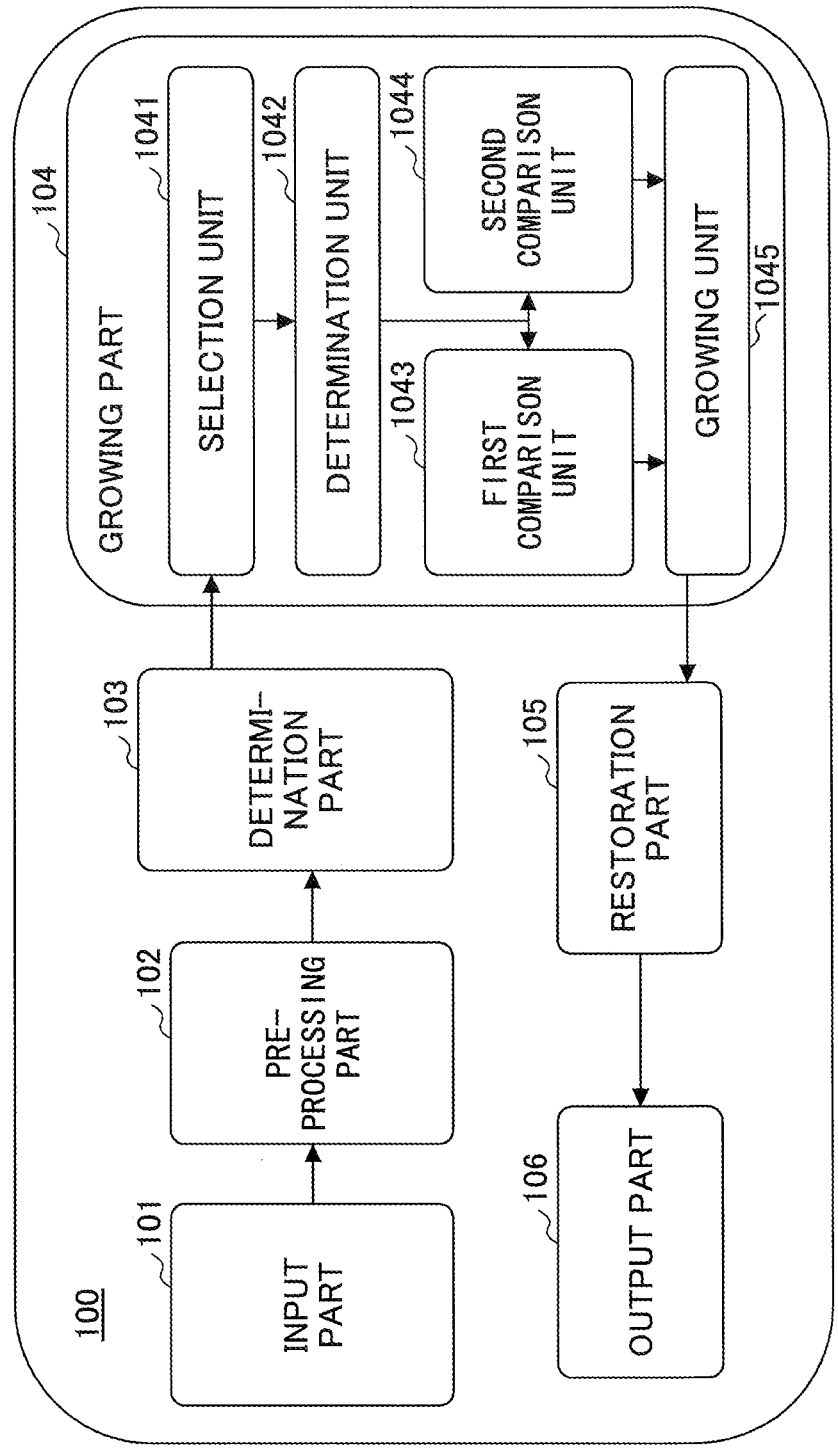
FIG. 6 illustrates a system for restoring a depth value(s) of a depth map, according to an embodiment of the present invention.

Next, in STEP S12, image preprocessing is conducted with respect to the input RGB-D images by a preprocessing part 102 of the depth value restoration system 100 shown in FIG. 6, so as to reduce some image noise. At present, there are many well-used image noise reduction approaches such as a median filtering approach and a mean filtering approach. Considering that the properties of the RGB image and the depth map (i.e., the depth image) are different, in this embodiment, regarding the depth map, the median filtering approach is adopted for filtering some depth noise (specially, for filtering some random noise), and regarding the RGB image, a histogram equalization approach is adopted for decreasing the influence due to a lighting condition. The median filtering approach is a kind of non-linear smoothing approach in which the grayscale value of each pixel point is set to the median of the grayscale values of all pixel points in a predetermined region including the corresponding pixel point. The histogram equalization approach is a kind of well-used approach of erasing the negative influence due to the change of a lighting condition. The basic concept of the histogram equalization approach is converting the histogram of an image into an evenly-distributed form. In this way, it is possible to increase a dynamic range of grayscale values of pixel points so as to achieve the effect of enhancing the overall contrast of the image, so that it is possible to erase the negative influence due to the change of a lighting condition. Here it should be noted that alternatively, the image preprocessing may not be carried out with respect to the input RGB-D images. That is to say, the follow-on processes of the depth value restoration method according to this embodiment may be directly carried out on the basis of the input RGB-D images.

After that, regarding the preprocessed RGB-D images, in STEP S13, it is determined by a determination part 103 of the depth value restoration system 100 shown in FIG. 6 whether it is necessary to conduct a region growing process with respect to a candidate region (for example, the region respectively represented by the depth map and its corresponding color image shown in FIG. 1). In general, in a process of initially generating a depth map, it is necessary to carry out pixel point matching so as to give a depth value to each pixel point. Although most of the pixel points can be correctly matched, there are still some pixel points which cannot be correctly matched, and cannot be given valid depth values. These kinds of pixel points, which cannot be given valid depth values, may generate a "black hole" in the depth map, i.e., a portion of the depth map lacking valid depth values (also called an "invalid region"). Hence, in this embodiment, the main purpose of conducting the region growing process is to fill a black hole in the depth map on the basis of pixel points in a neighboring region (also called "neighboring pixel points"). Usually, in a depth image, the appearance of a black hole is random. As a result, in this embodiment, before performing the region growing process, it should be determined whether it is necessary to carry out the region growing process with respect to a candidate region, i.e., whether STEP S13 should be conducted.

In this embodiment, the number of pixel points having invalid depth values (also called "invalid pixel points") in the candidate region is obtained, and then the area of all the invalid pixel points is calculated. Whether it is necessary to conduct the region growing process with respect to the candidate region is determined on the basis of whether the area ratio of an invalid region (i.e., a black hole formed by the invalid pixel points) to a candidate object region (also called an "object region") is greater than a predetermined threshold value. Here it should be noted that the predetermined threshold value may be preset in advance according to an actual object whose depth values in a corresponding depth map need to be restored. For example, if the actual object is a human hand, then the predetermine threshold value may be set to ⅕. That is to say, if the area ratio of the invalid region to the object region is greater than ⅕, then it is possible to determine that it is necessary to carry out the region growing process with respect to the whole candidate region; otherwise, it is possible to directly carry out a depth value restoration process with respect to the human hand.

In particular, if it is determined, in STEP S13, that it is necessary to conduct the region growing process with respect to the whole candidate region, then STEP S14 will be carried out. In STEP S14, the region growing process is conducted on the basis of the depth map by using a growing part 104 of the depth value restoration system 100 shown in FIG. 6.

Figure 3:
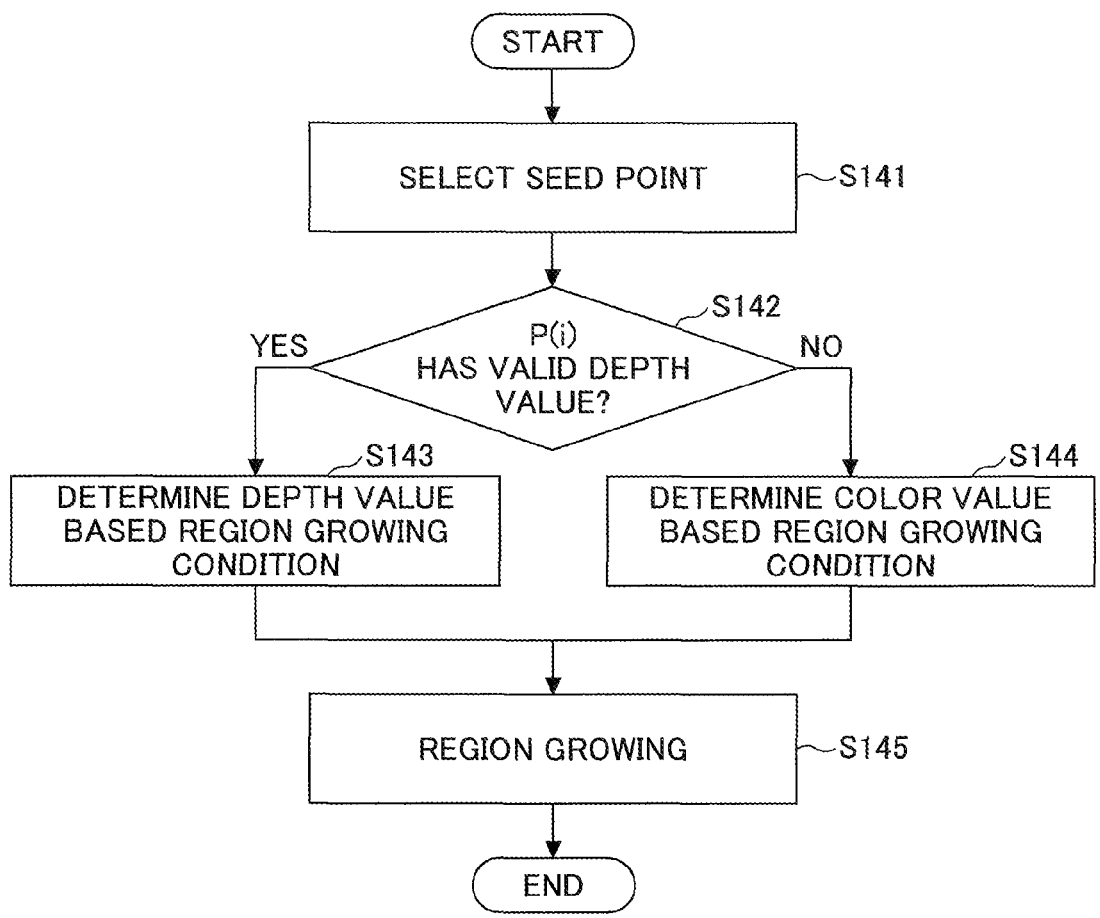
FIG. 3 is a flowchart of conducting a region growing process on the basis of RGB-D images.

FIG. 3 is a flowchart of conducting a region growing process on the basis of RGB-D images in an embodiment of the present invention.

Region growing is a well-used approach in the field related to the present invention. For more information about the region growing, for example, it is possible to see http://en.wikipedia.org/wiki/Region_growing. In general, a first step in the region growing is to select a set of seed points. Seed point selection is on the basis of some user criterion (for example, pixels in a certain grayscale range, pixels evenly spaced on a grid, etc.). The initial region begins as the exact location of these seeds. The regions are then grown from these seed points to adjacent points depending on a region membership criterion. The criterion could be, for example, pixel intensity, grayscale texture, or color. However, according to different application scenarios, the specific region growing approaches are different. In this embodiment, a region growing process on the basis of RGB-D images is proposed as follows.

First, in the region growing, the suitable selection of seed points is very important. The selection of seed points is dependent on the users and environments. For example, in a grayscale lightning image, we may want to segment the lightning from the background. Then probably, we can examine the histogram and choose the seed points from the highest range of it.

In this embodiment, as shown in FIG. 3, in STEP 5141, by using a selection unit 1041 of the growing part 104 in the depth value restoration system 100 shown in FIG. 6, a seed point is selected, and its corresponding depth value is obtained from a preprocessed depth map (hereinafter, for the sake of convenience, also called a "depth map"). Since one of the purposes of the present invention is to carry out the noise reduction, in this embodiment, the central point of a candidate object needing to be segmented, such as a human hand is selected as a seed point. Here it should be noted that the selected central point should have a valid depth value. In addition, the seed point selection is conducted with respect to only a foreground region so that it is possible to decrease the amount of calculation. Of course, the so-called central point is not limited to the geometrical center or the mass center of the human hand; that is to say, it may be any point located within a circle whose center is the geometrical center of the mass center of the human hand and whose radius is predetermined, or may be any point which belongs to the human hand and which has a valid depth value.

After the seed point selection, in STEP 5142, by utilizing a determination unit 1042 of the growing part 104 in the depth value restoration system 100 shown in FIG. 6, for each current pixel point P(i) located within a predetermined region which includes the seed point and which is formed by a predetermined number of pixel points (for example, 4, 8, or 16), it is determined whether the depth value of the corresponding current pixel point (also called a "candidate growing point") is valid.

Here it should be noted that a range of valid depth values depends on the performance of a camera. For example, in a case where a range of valid depth values that a camera can capture is [T1, T2], if the depth value of a pixel point is within [T1, T2], then it is valid; otherwise, it is invalid. In particular, in a case where the valid depth value range of a camera is [1, 5000], if the depth value of a pixel point is greater than 5000 or equal to 0, then the depth value of the pixel point is invalid; in other words, if the depth value of the pixel point is within [1, 5000], then the depth value of the pixel is valid.

If it is determined, in STEP 5142, that the depth value of the candidate growing point is valid, STEP 5143 will be conducted. In STEP 5143, by using a depth value difference comparison unit (also called a "first comparison unit") 1043 of the growing part 104 in the depth value restoration system 100 shown in FIG. 6, a region growing condition (also called a "a depth value based region growing condition") is determined on the basis of the depth values of the seed point and the candidate growing point. However, if it is determined that the depth value of the candidate growing point is invalid, then STEP 5144 will be conducted. In STEP 5144, by utilizing a color value difference comparison unit (also called a "second comparison unit") 1044 of the growing part 104 in the depth value restoration system 100 shown in FIG. 6, it is determined whether it is necessary to conduct the region growing with respect to the candidate growing point on the basis of color information.

In particular, in STEP 5143, the first comparison unit 1043 determines, on the basis of the depth value based region growing condition, whether the candidate growing point grows. Here a depth similarity threshold value D is adopted as the depth value based region growing condition for determining whether the candidate growing point grows. Namely, the difference of the depth values of the seed point and the candidate growing point is calculated, and then, it is determined whether the difference is less than or equal to the depth similarity threshold value D. In the former case, that means the candidate growing point needs to grow so as to become a member of a current growing region. After that, STEP 5145 will be conducted in which, by using a region growing unit (also called a "growing unit") 1045 of the growing part 104 in the depth value restoration system 100 shown in FIG. 6, the region growing is conducted with respect to the candidate growing point. In the latter case, that means the candidate growing point does not meet the depth value based region growing condition, and does not need to grow; that is to say, perhaps the candidate growing point does not belong to the foreground region, and may be ignored. Here it should be noted that the depth similarity threshold value D may be determined according to the accuracy of a camera. For example, if the accuracy of a camera is a mm (millimeter) level, then the unit of the depth similarity threshold value D is mm. In addition, the depth similarity threshold value D may also be determined on the basis of the physical characteristics of a candidate object needing to grow. For example, when the region growing is conducted with respect to a human hand region, in general, the depth similarity threshold value D may be set within a range of 10 to 50 mm. And the final depth similarity threshold value D may be obtained according to experimental data; for instance, it may be set to 10, 15, 20, or 50 mm.

On the other hand, in STEP 5144, the second comparison unit 1044 determines, on the basis of a color value based region growing condition, whether the candidate growing point grows. Here a color similarity threshold value C is adopted as the color value based region growing condition for determining whether the candidate growing point grows. Namely, the difference of the color values of the seed point and the candidate growing point is calculated, and then, it is determined whether the difference is less than or equal to the color similarity threshold value C. In the former case, that means the candidate growing point needs to grow so as to become a member of the current growing region. After that, STEP 5145 will be conducted in which the region growing is conducted with respect to the candidate growing point. In the latter case, that means the candidate growing point does not meet the color value based region growing condition, and does not need to grow; that is to say, perhaps the candidate growing point does not belong to the foreground region, and may be ignored. In general, according to experimental data, the color similarity threshold value C may be set to 5 to 30. For example, the color similarity threshold value C may be set to 5, 8, or 10.

In other words, if it is determined, in STEPS 5142 and 5143, that the candidate growing point has a valid depth value, and the depth value based region growing condition is met, then in STEP 5145, the candidate growing point is added into the current growing region. On the other hand, if it is determined, in STEPS 5142 and 5144, that the candidate growing point does not have a valid depth value, and the color value based region growing condition is met, then in STEP 5145, the candidate growing point is also added into the current growing region; after that, the depth value of the seed point is given to the candidate growing point. However, if the candidate growing point (i.e., the corresponding current pixel point) does not meet either the depth value based region growing condition if it has a valid depth value or the color value based region growing condition if it has an invalid depth value, then it cannot be added into the current growing region.

In this way, it is possible to carry out the region growing process with respect to each current pixel point P(i) located within the predetermined region including the seed point.

Figure 4:
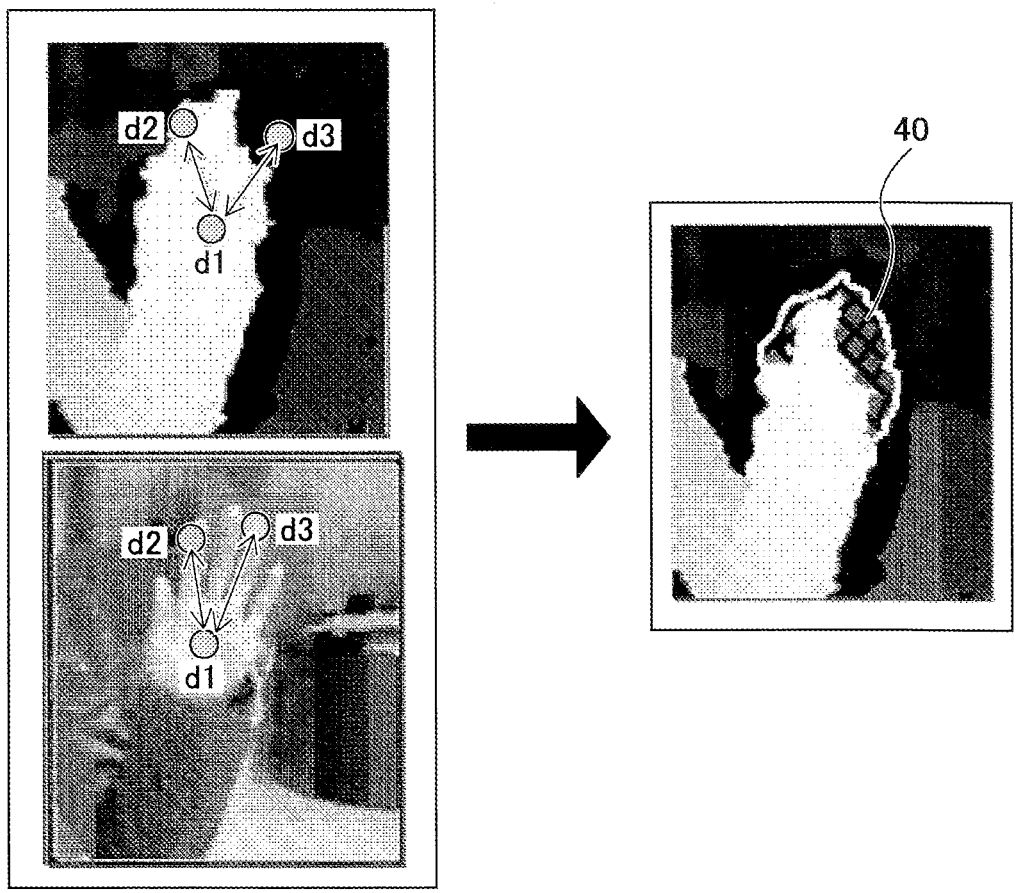
FIG. 4 illustrates an example of conducting, based on RGB-D information, a region growing process with respect to a depth map.

FIG. 4 illustrates an example of conducting, based on RGB-D information, a region growing process with respect to a depth map in the embodiment of the present invention.

In FIG. 4, on the left side, there are two images which are called a "first image" and a "second image" from top to bottom, respectively. And on the right side, there is one image which is called a "third image". The first image is the depth image of a candidate region, the second image is the corresponding color image of the candidate region, and the third image is the processed depth map after the region growing process is conducted with respect to the first image.

In the first and second images, the pixel point d1 refers to a seed point which has a valid depth value, the pixel point d2 refers to a candidate growing point which has a valid depth value, and the pixel point d3 refers to a candidate growing point which has an invalid depth value. Regarding the candidate growing point d2, first the above-mentioned depth similarity threshold value D is preset to 50 mm according to experimental data. After that, the difference between the depth values of the pixel points d1 and d2 is calculated. Here it is assumed that the calculated difference is 30 mm which is less than the depth similarity threshold value D. As a result, the pixel point d2 can be added into a current growing region. Here it should be noted that since the pixel point d2 has a valid depth value, it is not necessary to give the depth value of the pixel point d1 to the pixel point d2. In addition, if the calculated difference is greater than the depth similarity threshold value D, then the pixel point d2 cannot be added into the current growing region. On the other hand, regarding candidate growing point d3, first the above-mentioned color similarity threshold value C is preset to 30 according experimental data. After that, the difference between the color values of the pixel points d1 and d3 is calculated. Here it is assumed that the calculated difference is 15 which is less than the color similarity threshold value C. As a result, the pixel point d3 can be added into the current growing region. In this case, since the pixel point d3 does not have a valid depth value, the depth value of the pixel point d1 is given to the pixel point d3. Here it should be noted that if the calculated difference is greater than the color similarity threshold value C, then the pixel point d3 cannot be added into the current growing region.

In this way, it is possible to conduct the region growing process with respect to each pixel point in the candidate region so as to be able to obtain the processed depth map, i.e., the third image of FIG. 4. Here it should be noted that as shown in the third image of FIG. 4, the mesh-shaped shadow region 40 is a new region in which the depth values of pixel points are valid and which is added after conducting the region growing process.

According to the third image of FIG. 4, it is obvious that some pixel points lacking invalid depth values may be filled by carrying out the region growing process. However, this kind of region growing process may also bring some noise points. As a result, in order to erase these kinds of noise points, it is necessary to further carry out a depth value restoration process with respect to a grown region.

For this purpose, here refer to FIG. 2 again. In STEP S15, a depth value restoration process is conducted with respect to a candidate object in the depth map. In what follows, a human hand is taken as an example of the candidate object.

In particular, in STEP S15, by utilizing a depth value restoration part (also called a "restoration part") 105 in the depth value restoration system 100 shown in FIG. 6, the depth values of some pixel points in the depth map are restored. This kind of depth value restoration process is on the basis of the following rule, namely, the depth value of a pixel point is decided according to the depth values of all pixel points located in a neighboring region.

Figure 5:
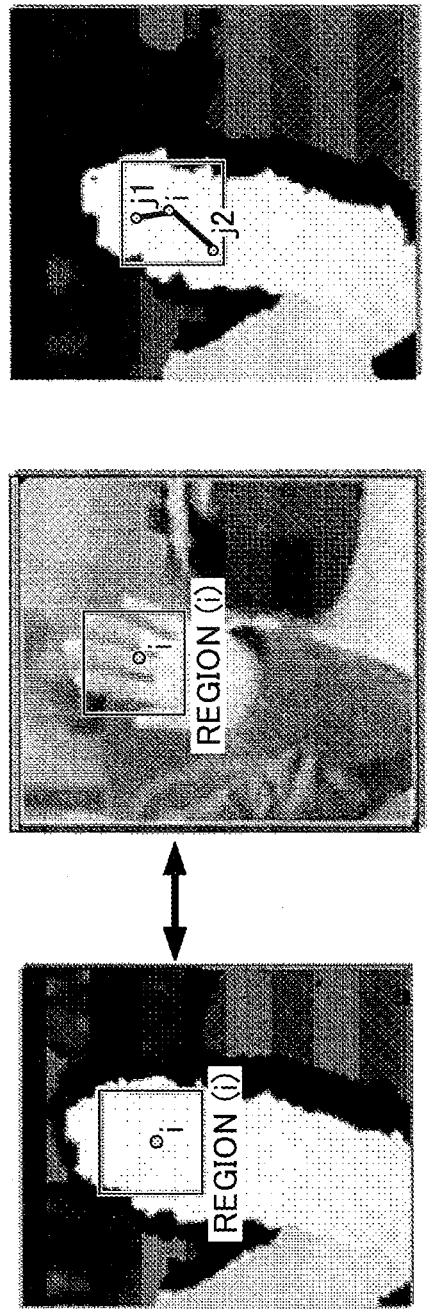
FIG. 5 illustrates an example of restoring the details of a human hand in a depth map.

FIG. 5 illustrates an example of restoring the details of a human hand in a depth map in the embodiment of the present invention.

In the depth value restoration process, the depth value of each pixel point is obtained according to calculation conducted with respect to all pixel points located in a neighboring region of the corresponding pixel point.

In FIG. 5, there are three images which are called a "fourth image", a "fifth image", and a "sixth" image from left to right. The fourth image is a depth image in which the region (i) is a neighboring region of a pixel point i. The fifth image is a color image or a grayscale image corresponding to the fourth image. The sixth image is a depth image which corresponds to the fourth image, and shows two neighboring pixel points j1 and j2 located in the neighboring region (i).

As shown in the fourth image, the depth value of the pixel point i may be obtained according to calculation conducted with respect to the depth values of all pixel points located in the neighboring region. Here it should be noted that the neighboring region may be formed by, for example, 4, 8, or 16 pixels. In addition, in this embodiment, the area of the neighboring region is inversely proportional to the depth value of the human hand. In other words, if the area of the neighboring region is too large, then the amount of calculation may be increased, and at the same time, some noise may be additionally introduced (generated); if the area of the neighboring region is too small, then the number of valid pixel points may be decreased, and at the same time, the noise reduction performance may be bad. As a result, in order to reasonably set the size of the neighboring region, in this embodiment, the area of the neighboring region should be inversely proportional to the depth value of the human hand. In particular, if the human hand is near a corresponding camera, then the area of the neighboring region is relatively large; if the human hand is far away from the corresponding camera, then the area of the neighboring region is relatively small. That is to say, the area (size) of the neighboring region may be determined according to actual needs.

For example, in a candidate region, any pixel point may be selected as a central pixel point i, and then, a neighboring region of the central pixel point i may be determined. After that, the new depth value of the central pixel point i may be calculated by using the following equations (1) and (2).

$$\overline{D(i)} = \frac{1}{\omega}\sum_{j\in region(i)} \omega_{ij} D(j) \tag{1}$$

$$\omega = \sum_{j\in region(i)} \omega_{ij} \tag{2}$$

In the equation (1), $D(j)$ is the depth value of a neighboring pixel point j in the neighboring region (i), and $\omega_{ij}$ is a weighting coefficient, and represents the degree of similarity between the central pixel point i and the neighboring pixel point j. The larger the weighting coefficient $\omega_{ij}$ is, the higher the degree of similarity the central pixel point i and the neighboring pixel point j is. In this embodiment, the weighting coefficient $\omega_{ij}$ may be obtained on the basis of a spatial position relationship, color information, depth information, and gradient information by using the following equation (3).

$$\omega_{ij} = \begin{cases} g_s(i-j)*g_I(I(i)-I(j))*g_d(D(i)-D(j))*g_g(G(i)-G(i)) & \text{if } D(i) \text{ is valid} \\ g_s(i-j)*g_I(I(i)-I(j))*g_g(G(i)-G(j)) & \text{if } D(i) \text{ is invalid} \end{cases} \tag{3}$$

In the equation (3), if the central pixel point i has a valid depth value $D(i)$, then the weighting coefficient $\omega_{ij}$ may be obtained on the basis of spatial weighting, color weighting, depth weighting, and gradient weighting. And if the depth value $D(i)$ is invalid, then the weighting coefficient $\omega_{ij}$ may be obtained on the basis of only the spatial weighting, the color weighting, and the gradient weighting.

The spatial weighting refers to a spatial position relationship between the central pixel point $i(x_i, y_i)$ and the neighboring pixel point $j(x_j, y_j)$. A spatial weighting coefficient may be obtained by using a spatial kernel function $g_s(i-j)$. In this embodiment, the spatial kernel function $g_s(i-j)$ is a Gaussian kernel function in which the central position point of this function is the central pixel point i, as shown by the following equation (4).

$$g_s(i-j) = \exp\left(\frac{-\|i-j\|^2}{\sigma_s^2}\right) \tag{4}$$

According to the equation (4), if the neighboring pixel point j is far away from the central pixel point i, then the spatial weighting coefficient $g_s(i-j)$ is relatively small. And if the neighboring pixel point j is near the central point i, then the spatial weighting coefficient $g_s(i-j)$ is relatively large. In addition, in the equation (4), $\sigma_s$ is the bandwidth of the Gaussian kernel function.

In this embodiment, it is possible to calculate $\sigma_s$ in the equation (4) by utilizing the following equation (5).

$$\sigma_s = \min(\text{Width}, \text{Height})/16 \tag{5}$$

In the equation (5), Width and Height refer to the width and the height of the neighboring region (i). Here it should be noted that the equation (5) is just a kind of empirical expression; that is to say, it is also possible to adjust the bandwidth according to actual environments. In addition, for more information about the Gaussian kernel function, for example, it is possible to see http://en.wikipedia.org/wiki/Gaussian_function.

The color weighting refers to the degree of similarity between the colors of the central pixel point i and the neighboring pixel point j in the color image or the grayscale image (i.e., the fifth image of FIG. 5). A color weighting coefficient may be obtained by adopting a Gaussian kernel function $g_I(I(i)-I(j))$. In particular, if the central pixel point i and the neighboring pixel point j are of a grayscale image (single channel), then the color weighting coefficient may be obtained by using the following equation (6). And if the central pixel point i and the neighboring pixel point j are of a color image (multi channels), then the color weighting coefficient may be obtained by utilizing the following equation (7).

$$g_I(I(i)-I(j)) = \exp\left(\frac{-\|I(i)-I(j)\|^2}{\sigma_I^2}\right) \tag{6}$$

-continued $$g_I(I(i)-I(j)) = \exp\left(\frac{-\|R(i)-R(j)\|^2}{\sigma_R^2}\right) * \\ \exp\left(\frac{-\|G(i)-G(j)\|^2}{\sigma_G^2}\right) * \exp\left(\frac{-\|B(i)-B(j)\|^2}{\sigma_B^2}\right) \tag{7}$$

In the equation (7), $R(i)$, $G(i)$, and $B(i)$ refer to red, green, and blue channels, respectively. Furthermore, in the equations (6) and (7), $\sigma_I$, $\sigma_R$, $\sigma_G$, and $\sigma_B$ are the bandwidths of the Gaussian kernel functions, and the values of them are 0.2 (here, it should be noted that this value may be adjusted according to actual needs).

The depth weighting refers to the degree of similarity between the depth values of the central pixel point i and the neighboring pixel point j in the depth map (i.e., the fourth image of FIG. 5). A depth weighting coefficient may be obtained by utilizing a depth kernel function $g_d(D(i)-D(j))$. In general, an object has a range of continuous depth values. As a result, if the difference between the depth values of the central pixel point i and the in the neighboring pixel point j is too large, then the two may be considered not belonging to a same object. On the basis of this, the depth kernel function may be expressed as follows.

$$g_d(D(i) - D(j)) = \begin{cases} \exp\left(\dfrac{-\|D(i) - D(j)\|^2}{\sigma_D^2}\right) & \ldots |D(i) - D(j)| < T \\ 0 & \ldots |D(i) - D(j)| \geq T \end{cases} \quad (8)$$

In the equation (8), T is a constant threshold value which may be predetermined according to experimental data. Here, in a case where a human hand is taken as an example, T may be set to 200 mm. Of course, T may also be set to a value within a range of 100 mm to 200 mm, for example, 100 mm, 150 mm, or 200 mm. If the difference between the depth values of the central pixel point i and the neighboring pixel point j is greater than or equal to T, then the two may not belong to a same object. In this case, the depth weighting coefficient is set to 0. On the other hand, if the difference between the depth values of the two points is less than T, then the depth kernel function may also be expressed by a Gaussian kernel function in which $\sigma_D$ refers to the bandwidth of this function. In this embodiment, according to experimental data, T is set to 0.5.

The gradient weighting refers to the degree of similarity between the gradients of the central pixel point i and the neighboring pixel point j in the grayscale image or the color image (i.e., the fifth image of FIG. 5). A gradient weighting coefficient may be obtained by adopting a gradient kernel function $g_g(G(i)-G(j))$ which is also a Gaussian kernel function. The following equation (9) is the gradient kernel function adopted in this embodiment.

$$g_g(G(i) - G(j)) = \exp\left(\dfrac{-\|G(i) - G(j)\|^2}{\sigma_g^2}\right) \quad (9)$$

In the equation (9), G(i) refers to the gradient distribution of a region including the central pixel point i, and G(j) refers to the gradient distribution of a region including the neighboring pixel point j. In this embodiment, the gradient distributions along horizontal and vertical directions in the region including the central pixel point i or the neighboring pixel point j are adopted to serve as the gradient components of the corresponding pixel point. Moreover, in the equation (9), $\sigma_g$ refers to the bandwidth of the Gaussian kernel function, whose value is 2. Here it should be noted that the gradient weighting is advantageous to restoring the boundary information.

Therefore, on the basis of the equation (3) above, plural weighting coefficients are utilized for calculating the new depth value of the central pixel point i. The plural weighting coefficients include the spatial weighting coefficient, the color weighting coefficient, the depth coefficient, and the depth weighting coefficient. For example, if it is assumed that a current pixel point k needs to be processed, and pixel points p and q belong to the neighboring region of the current pixel point k, then in a process of calculating the new depth value of the current pixel point k, first it is necessary to respectively calculate the spatial weighting coefficients, the color weighting coefficients, the depth weighting coefficients, and the gradient weighting coefficients between the current pixel point k and the pixel points p and q. In this way, although the pixel points p and q have a same spatial weighting coefficient and a same depth weighting coefficient, if their color weighting coefficients or gradient weighting coefficients are different, then the pixel points p and q may differently influence the new depth value of the current pixel point i. As a result, in this embodiment, it is possible to effectively reduce the depth noise and to better restore the details of a candidate object, so as to improve the image quality.

Finally, a processed depth image, whose depth values have been restored by the depth value restoration process in STEP S15 of FIG. 2, is output by an image output part (also called an "output part") 106 of the depth value restoration system 100 shown in FIG. 6.

FIG. 6 illustrates the system 100 for restoring a depth value(s) of an initial depth map, according to an embodiment of the present invention.

As shown in FIG. 6, the system 100 includes the input part 101, the preprocessing part 102, the determination part 103, the growing part 104, a restoration part 105, and the output part 106. And the growing part 104 includes the selection unit 1041, the determination unit 1042, the first comparison unit 1043, the second comparison unit 1044, and the growing unit 1045. Here it should be noted that since the processes related to the respective parts and units have been concretely illustrated above, the repeated descriptions are omitted here.

To sum up, in the embodiments of the present invention, by utilizing the RGB-D image information and by adopting the region growing process, it is possible to fill, with depth data, some pixel points in an initial depth map, whose depth values are lost. In the region growing process, the region growing condition is determined on the basis of the related color information or depth information. As a result, by utilizing the related depth information to determine the region growing condition, it is possible to decrease the negative influence due to a similar color. And by utilizing the related color information to determine the region growing condition, it is possible to restore the missing depth values of some pixel points in the initial depth map.

In addition, in the embodiments of the present invention, by utilizing the weighting coefficients, it is possible to effectively reduce the depth noise and restore the details of a candidate object, for example, boundary information and outline information. The weighting coefficients include the spatial weighting coefficient, the color weighting coefficient, the depth weighting coefficient, and the gradient weighting coefficient.

Here it should be noted that the above respective embodiments are just exemplary ones, and the specific structure and operation of them may not be used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Priority Patent Application No. 201410195236.5 filed on May 9, 2014, the entire contents of which are hereby incorporated by reference.

What is claimed is:

1. A depth value restoration method comprising:
    conducting image noise reduction with regard to a depth map and a corresponding color image to establish a candidate object region in each of the depth map and the corresponding color image, respectively, the candidate object region of the depth map including a foreground image from the depth map and the candidate object region of the corresponding color image including a foreground image from the corresponding color image;
    identifying an area of the candidate object region of the depth map associated with invalid depth values based on a determination that the area is associated with depth values that exceed a threshold range of valid depth values, the area being an invalid region of the depth map;
    determining whether an area ratio of the invalid region to the candidate object region of the depth map is greater than a particular threshold value;
    conducting region growing of the candidate object region of the depth map to generate a grown candidate object region of the depth map, based on
    determining whether at least one candidate growing point grows, wherein determining whether the at least one candidate growing point grows includes
        determining whether a depth value of the at least one candidate growing point is within a threshold range of valid depth values such that the depth value is valid; and
        if the depth value of the at least one candidate growing point is valid,
        calculating a depth value difference between the at least one candidate growing point and a seed point, and
        if the depth value difference is less than or equal to a predetermined depth similarity threshold value, adding the at least one candidate growing point into a growing region, or
        if the depth value of the at least one candidate growing point is invalid,
        calculating a color difference between the at least one candidate growing point and the seed point, and
        if the color difference is less than or equal to a predetermined color similarity threshold value,
        giving the depth value of the seed point to the at least one candidate growing point, and
        adding the at least one candidate growing point into the growing region, and
    determining that the area ratio is greater than the particular threshold value; and
    restoring depth values of one or more pixel points of the grown candidate object region of the depth map according to depth values of each pixel point located in a neighboring region of the depth map to generate a processed depth map.

2. The depth value restoration method according to claim 1, further comprising:
    restoring depth values of one or more pixel points of the candidate object region of the depth map according to depth values of each pixel point located in a neighboring region of the depth map to generate a processed depth map, based on determining that the area ratio is less than or equal to the particular threshold value.

3. The depth value restoration method according to claim 1, wherein conducting region growing of the candidate object region of the depth map includes
    selecting a pixel point in the foreground image of the depth map as the seed point, the selected pixel point having a valid depth value;
    selecting each pixel point from a neighboring region of the seed point in the candidate object region of the depth map as a separate candidate growing point in the candidate object region of the depth map; and
    adding the at least one candidate growing point into the growing region based on determining that the at least one candidate growing point grows.

4. The depth value restoration method according to claim 1, wherein restoring depth values of one or more pixel points of the grown candidate object region of the depth map includes
    selecting a pixel point from the grown candidate object region, and generating a neighboring region, the generated neighboring region including a central point that is the selected pixel point;
    calculating a weighting coefficient of a depth value of each pixel point in the generated neighboring region to a depth value of the central point, based on a relationship between each pixel point in the generated neighboring region and the central point; and
    calculating a second depth value of the central point, based on both the calculated weighting coefficients and the depth value of each pixel point in the generated neighboring region; and giving the calculated second depth value to the central point to serve as a new depth value of the central point.

5. The depth value restoration method according to claim 4, wherein
the relationship between each pixel point in the generated neighboring region and the central point includes
a spatial relationship,
a color relationship,
a depth relationship, and
a gradient relationship.

6. The depth value restoration method according to claim 5, further comprising:
obtaining the weighting coefficient of the depth value of each pixel point in the generated neighboring region to the depth value of the central point based on calculating a product of a spatial weighting coefficient, a color weighting coefficient, a gradient weighting coefficient, and/or a depth weighting coefficient between the corresponding pixel point and the central point.

7. The depth value restoration method according to claim 6, wherein
the spatial weighting coefficient, the color weighting coefficient, the gradient weighting coefficient, and the depth weighting coefficient are calculated based on utilizing a weighting kernel function, respectively.

8. The depth value restoration method according to claim 4, wherein
an area of the generated neighboring region is inversely proportional to a depth value of the selected pixel point.

9. A depth value restoration system comprising:
a memory storing computer-readable instructions; and
a processor configured to execute the computer-readable instructions to
conduct image noise reduction with regard to a depth map and a corresponding color image to establish a candidate object region in each of the depth map and the corresponding color image, respectively, the candidate object region of the depth map including a foreground image from the depth map and the candidate object region of the corresponding color image including a foreground image from the corresponding color image;
identify an area of the candidate object region of the depth map associated with invalid depth values based on a determination that the area is associated with depth values that exceed a threshold range of valid depth values, the area being an invalid region of the depth map;
determine whether an area ratio of the invalid region to the candidate object region of the depth map is greater than a particular threshold value;
conduct region growing of the candidate object region of the depth map to generate a grown candidate object region of the depth map, based on
determine whether at least one of the candidate growing points grows, wherein determining whether the at least one candidate growing point grows includes
determining whether a depth value of the at least one candidate growing point is within the threshold range of valid depth values such that the depth value is valid; and
if the depth value of the at least one candidate growing point is valid,
calculating a depth value difference between the at least one candidate growing point and a seed point, and
if the depth value difference is less than or equal to a predetermined depth similarity threshold value, adding the at least one candidate growing point into a growing region, or
if the depth value of the at least one candidate growing point is invalid,
calculating a color difference between the at least one candidate growing point and the seed point, and
if the color difference is less than or equal to a predetermined color similarity threshold value,
giving the depth value of the seed point to the at least one candidate growing point, and
adding the at least one candidate growing point into the growing region, and
determining that the area ratio is greater than the particular threshold value; and
restore depth values of one or more pixel points of the grown candidate object region of the depth map according to depth values of each pixel point located in a neighboring region of the depth map to generate a processed depth map.

10. The depth value restoration system according to claim 9, wherein the processor is configured to execute the computer-readable instructions to restore depth values of one or more pixel points of the candidate object region of the depth map according to depth values of each pixel point located in a neighboring region of the depth map to generate a processed depth map, based on determining that the area ratio is less than or equal to the particular threshold value.

11. The depth value restoration system according to claim 9, wherein the processor is configured to execute the computer-readable instructions interoperable with the memory to
select a pixel point in the foreground image of the depth map as the seed point, the selected pixel point having a valid depth value; and
select each pixel point from a neighboring region of the seed point in the candidate object region of the depth map as a separate candidate growing point in the candidate object region of the depth map; and
add the at least one candidate growing point into the growing region based on determining that the at least one candidate growing point grows.

12. The depth value restoration system according to claim 9, wherein the processor is configured to execute the computer-readable instructions to
select a pixel point from the grown candidate object region, and generating a neighboring region, the generated neighboring region including a central point that is the selected pixel point;
calculate a weighting coefficient of a depth value of each pixel point in the generated neighboring region to a depth value of the central point, based on a relationship between each pixel point in the generated neighboring region and the central point; and
calculate a second depth value of the central point, based on both the calculated weighting coefficients and the depth value of each pixel point in the generated neighboring region; and
give the calculated second depth value to the central point to serve as a new depth value of the central point.

13. The depth value restoration system according to claim 12, wherein
the relationship between each pixel point in the generated neighboring region and the central point includes
a spatial relationship,
a color relationship,
a depth relationship, and
a gradient relationship.

14. The depth value restoration system according to claim 13, wherein the processor is configured to execute the computer-readable instructions to
obtain the weighting coefficient of the depth value of each pixel point in the generated neighboring region to the depth value of the central point based on calculating a product of a spatial weighting coefficient, a color weighting coefficient, a gradient weighting coefficient, and/or a depth weighting coefficient between the corresponding pixel point and the central point.

15. The depth value restoration system according to claim 14, wherein
the spatial weighting coefficient, the color weighting coefficient, the gradient weighting coefficient, and the depth weighting coefficient are calculated based on utilizing a weighting kernel function, respectively.

16. The depth value restoration system according to claim 12, wherein
an area of the generated neighboring region is inversely proportional to a depth value of the selected pixel point.

17. A non-transitory computer readable storage medium storing a program of instructions, the program of instructions being executable by a computer system to cause the computer system to:
generate a processed depth map based on a depth map and a corresponding color image, each of the depth map and the corresponding color image including a common candidate object region, respectively, the generating including,
conducting region growing of the candidate object region of the depth map to generate a grown candidate object region of the depth map, based on
determining whether the at least one candidate growing point grows, wherein determining whether the at least one candidate growing point grows includes
determining whether a depth value of the at least one candidate growing point is within a threshold range of valid depth values such that the depth value is valid; and
if the depth value of the at least one candidate growing point is valid,
calculating a depth value difference between the at least one candidate growing point and a seed point, and
if the depth value difference is less than or equal to a predetermined depth similarity threshold value, adding the at least one candidate growing point into a growing region, or
if the depth value of the at least one candidate growing point is invalid,
calculating a color difference between the at least one candidate growing point and the seed point, and
if the color difference is less than or equal to a predetermined color similarity threshold value,
giving the depth value of the seed point to the at least one candidate growing point, and
adding the at least one candidate growing point into the growing region, and
determining that a ratio of an area of the depth map having pixel points associated with invalid depth values to an area of the candidate object region of the depth map is greater than a particular threshold value, the invalid depth values being depth values external to a threshold depth value range; and
restoring depth values of one or more pixel points of the grown candidate object region of the depth map according to depth values of each pixel point located in a neighboring region of the depth map.

18. The non-transitory computer readable storage medium of claim 17, wherein restoring depth values of one or more pixel points of the grown candidate object region includes,
selecting a pixel point from the grown candidate object region and generating a neighboring region, the generated neighboring region including a central point that is the selected pixel point;
calculating a weighting coefficient of a depth value of each pixel point in the generated neighboring region to a depth value of the central point, based on a relationship between each pixel point in the generated neighboring region and the central point;
calculating a second depth value of the central point, based on both the calculated weighting coefficients and the depth value of each pixel point in the generated neighboring region; and
giving the calculated second depth value to the central point to serve as a new depth value of the central point.

* * * * *